United States Patent
Sahara et al.

(10) Patent No.: US 9,426,319 B2
(45) Date of Patent: Aug. 23, 2016

(54) IMAGE READING APPARATUS AND NON-TRANSITORY COMPUTER READABLE MEDIUM

(71) Applicant: BROTHER KOGYO KABUSHIKI KAISHA, Aichi-ken (JP)

(72) Inventors: Shinya Sahara, Nagoya (JP); Kentaro Iwatsuka, Gifu (JP); Hiroyuki Nakazawa, Kasugai (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/670,997

(22) Filed: Mar. 27, 2015

(65) Prior Publication Data

US 2015/0281491 A1  Oct. 1, 2015

(30) Foreign Application Priority Data

Mar. 31, 2014  (JP) ................................. 2014-073041

(51) Int. Cl.
  *H04N 1/04*  (2006.01)
  *H04N 1/00*  (2006.01)

(52) U.S. Cl.
  CPC ................................. *H04N 1/00774* (2013.01)

(58) Field of Classification Search
  CPC .................................................. H04N 1/00774
  USPC .......... 358/496, 498, 461–465, 486; 382/274, 382/275
  See application file for complete search history.

(56) References Cited

U.S. PATENT DOCUMENTS

| 8,004,726 | B2 * | 8/2011 | Misaka | H04N 1/4076 358/420 |
| 9,001,398 | B2 * | 4/2015 | Mayama | H04N 1/024 358/461 |

FOREIGN PATENT DOCUMENTS

| JP | 2002-185706 A | 6/2002 |
| JP | 2003-207857 A | 7/2003 |
| JP | 2006-60493 A | 3/2006 |
| JP | 2007-181062 A | 7/2007 |

\* cited by examiner

*Primary Examiner* — Cheukfan Lee
(74) *Attorney, Agent, or Firm* — Scully, Scott, Murphy & Presser, P.C.

(57) ABSTRACT

An image reading apparatus includes a document feeder, a platen, an image reader, a drive unit, a memory, and a controller. The controller is configured to control the image reader to read a document fed by the document feeder over the platen at a reading position, control the image reader to read a reference plate over the platen at the reading position, to generate read data, determine whether the read data has an abnormality, store a value of the reading position of the image reader in the sub-scanning direction in the memory in response to determining that the read data has an abnormality, set a value of a position of the image reader in the sub-scanning direction to a value being different from the stored value within the predetermined range in response to determining that the read data has an abnormality and in response to receiving a reading instruction of another document, control the drive unit to move the image reader to the position of the set value, and control the image reader to read the other document fed by the document feeder over the platen after the image reader is moved to the position of the set value.

16 Claims, 13 Drawing Sheets

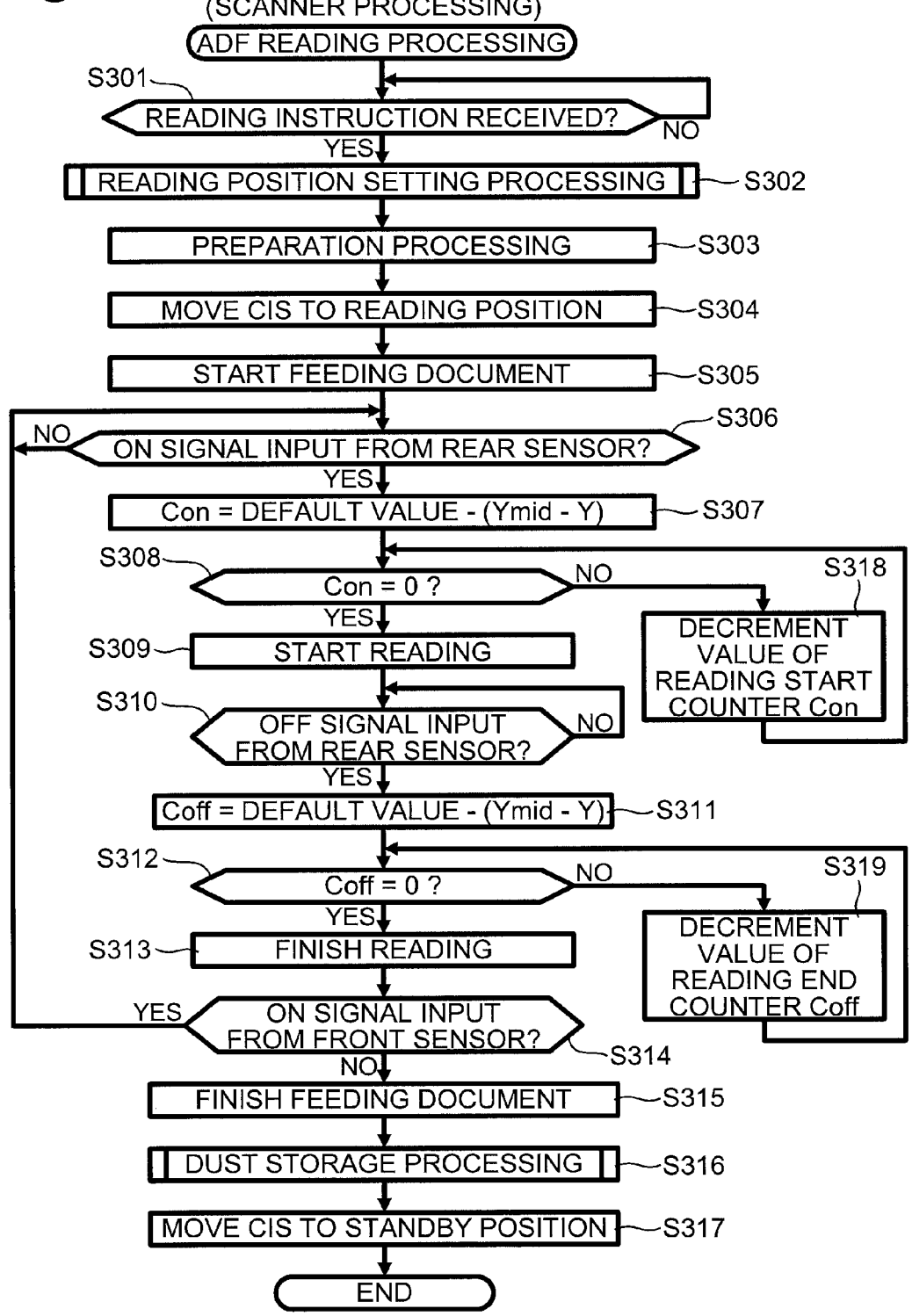

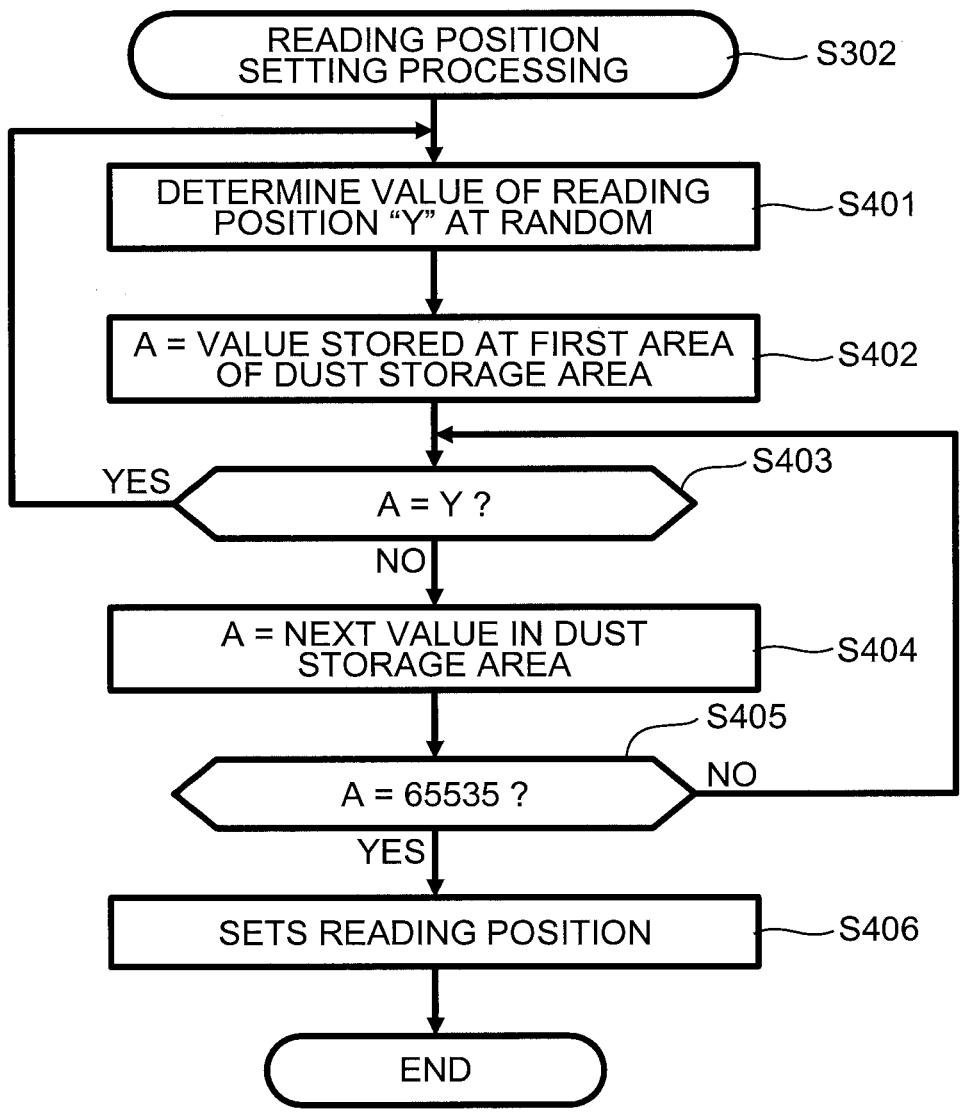

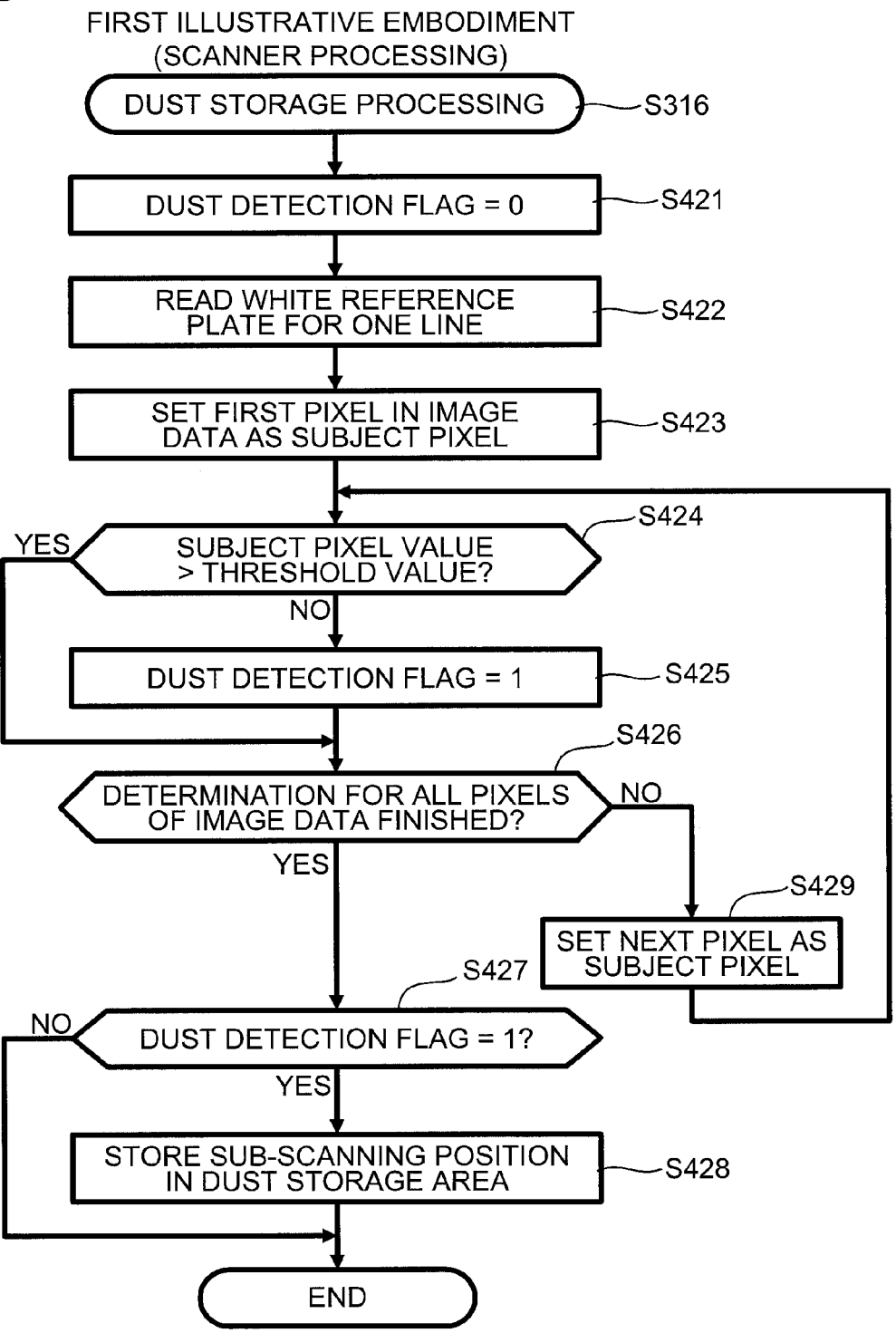

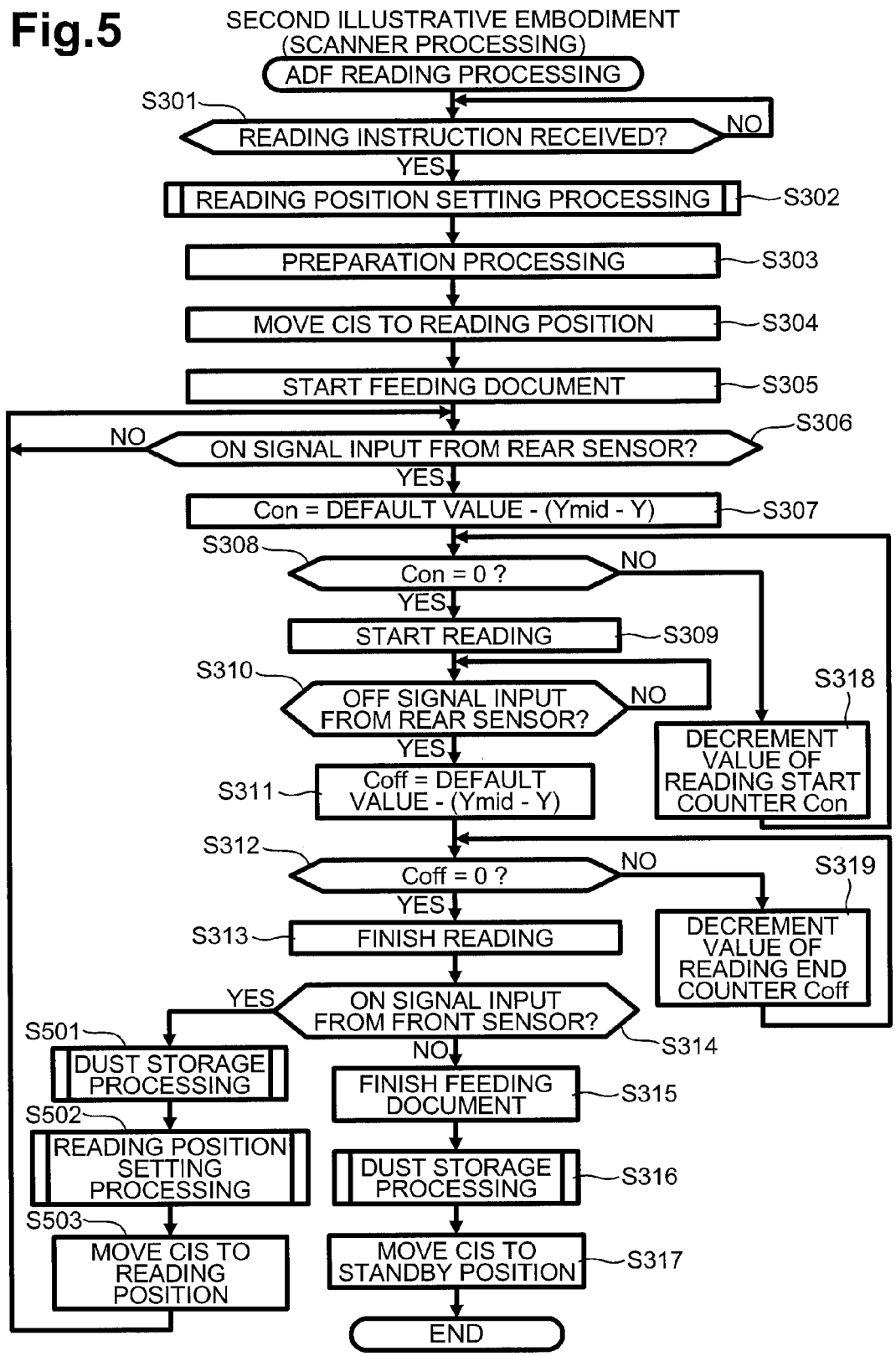

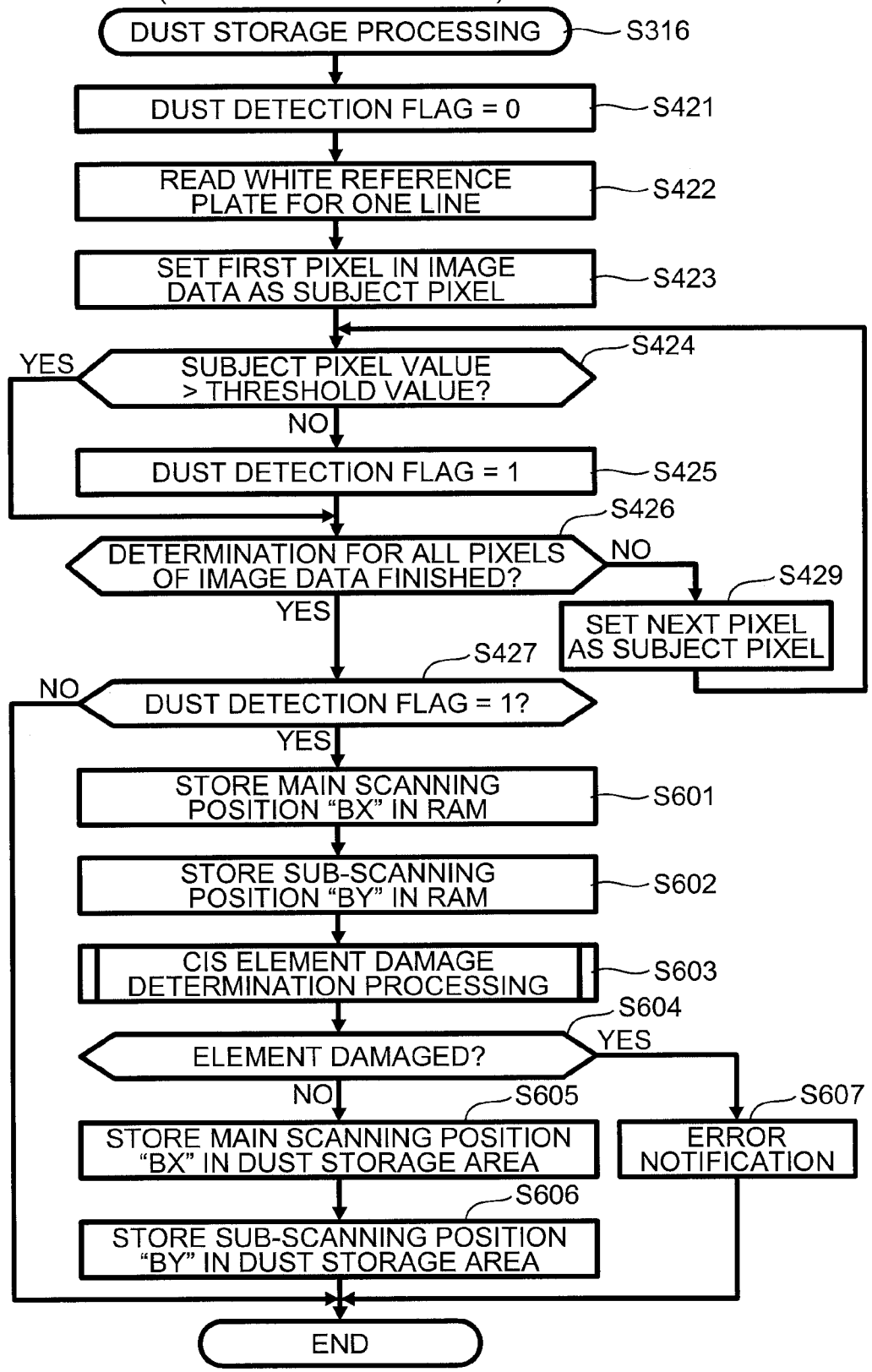

Fig.6B

|  | Q | Q | Q | R |  |  |  |
|---|---|---|---|---|---|---|---|
| 14a2 → | 502 | 25 | 400 | 65535 | 0 | 0 | |
| 14a1 → | 10 | 10 | 1500 | 65535 | 0 | 0 | |

↑
P

14a

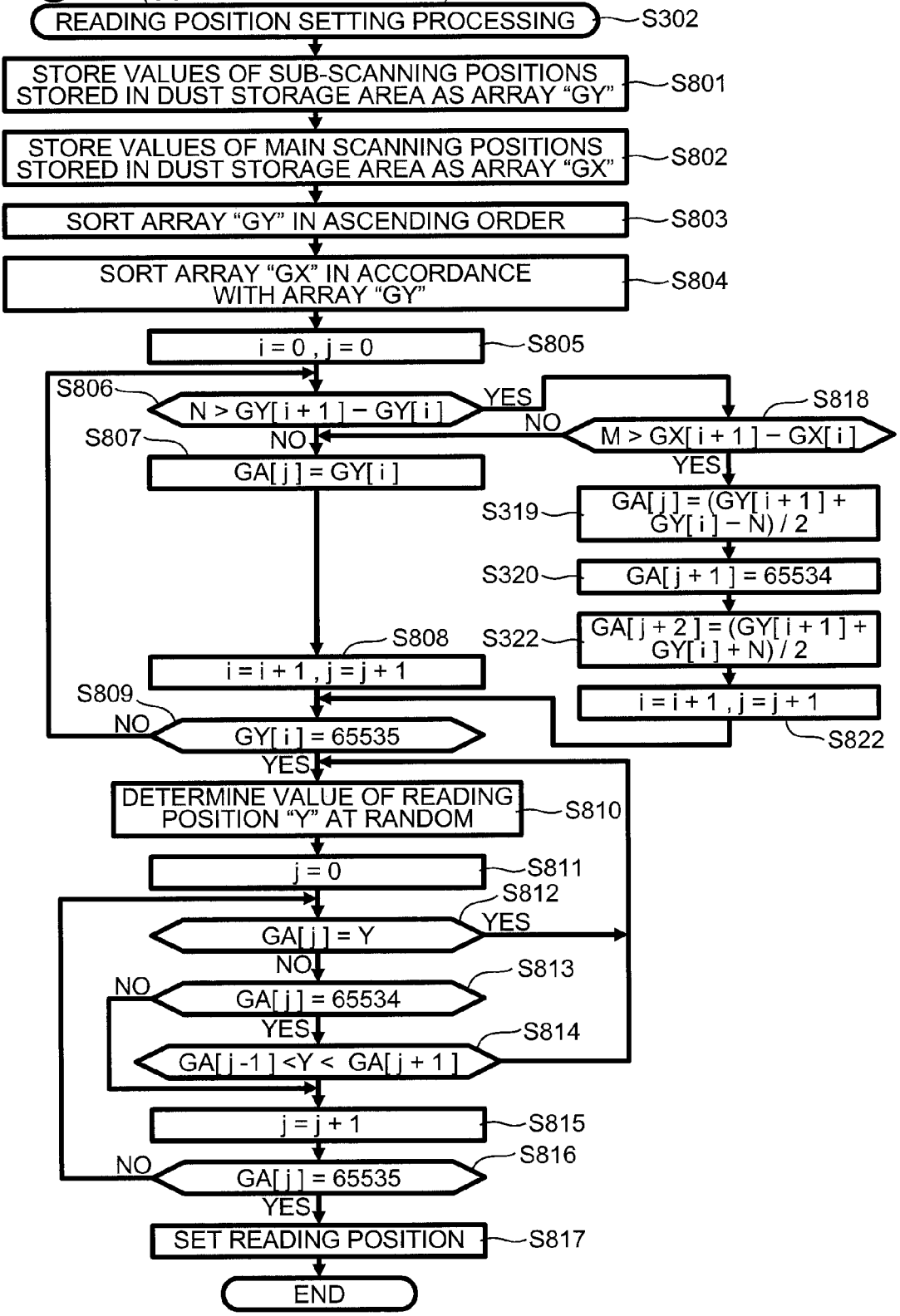

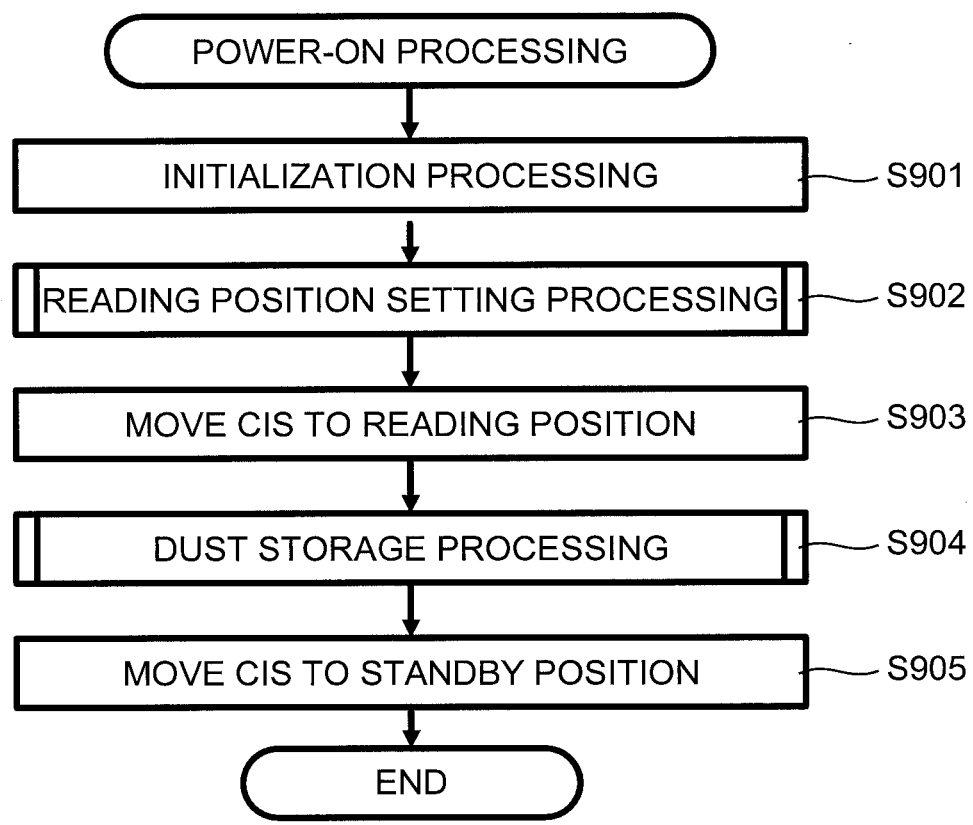

IMAGE READING APPARATUS AND NON-TRANSITORY COMPUTER READABLE MEDIUM

CROSS-REFERENCE TO RELATED APPLICATION

This application claims priority from Japanese Patent Application No. 2014-073041 filed on Mar. 31, 2014, the content of which is incorporated herein by reference in its entirety.

FIELD OF DISCLOSURE

The disclosure relates to an image reading apparatus and non-transitory computer readable medium.

BACKGROUND

A known scanner includes an automatic document feeder (hereinafter, referred to as the "ADF"). The scanner is configured to read a document using a reader fixed at a predetermined reading position, while feeding the document using the ADF. The scanner includes a transparent platen between the reader configured to read documents and a document fed by the ADF. Accordingly, the reader reads a document, via the platen. When dust adheres to the platen, the reader continuous reads the dust on the platen while the reader reads the document fed by the ADF. Therefore, an output image has a black streak extending in a document feeding direction.

To prevent or reduce such problem, the known scanner is configured to detect dust adhering to the platen before the scanner starts reading a document. The reader, e.g., a line sensor, is placed at a position avoiding a dust detected position.

In the known scanner, when dust is detected after the dust detection is performed at a reading position, the reader is moved to a next reading position. The movement of the reader is repeated until dust is not detected. Accordingly, a reading start may be delayed.

SUMMARY

According to aspects of the present disclosure, an image reading apparatus is provided that includes a document feeder configured to feed a document in a feeding direction, a platen, an image reader, a drive unit configured to move the image reader within a predetermined range in a sub-scanning direction parallel to the feeding direction, a memory, a controller configured to control the image reader to read a document fed by the document feeder over the platen at a reading position, control the image reader to read a reference plate over the platen at the reading position, to generate read data, determine whether the read data has an abnormality, store a value of the reading position of the image reader in the sub-scanning direction in the memory in response to determining that the read data has an abnormality, set a value of a position of the image reader in the sub-scanning direction to a value being different from the stored value within the predetermined range in response to determining that the read data has an abnormality and in response to receiving a reading instruction of another document, control the drive unit to move the image reader to the position of the set value, and control the image reader to read the other document fed by the document feeder over the platen after the image reader is moved to the position of the set value.

According to aspects of the present disclosure, further provided is a non-transitory computer readable medium having computer readable instructions stored thereon, which, when executed by a controller of an image reading apparatus, configures the controller to perform the steps of controlling an image reader of the image reading apparatus to read a document fed by a document feeder of the image reading apparatus over a platen of the image reading apparatus at a reading position, controlling the image reader to read a reference plate over the platen at the reading position, to generate read data, determining whether the read data has an abnormality, storing a value of the reading position of the image reader in the sub-scanning direction in the memory in response to determining that the read data has an abnormality, setting a value of a position of the image reader in the sub-scanning direction to a value being different from the stored value within the predetermined range in response to determining that the read data has an abnormality and in response to receiving a reading instruction of another document, controlling a drive unit of the image reading apparatus to move the image reader to the position of the set value, and controlling the image reader to read the other document fed by the document feeder over the platen after the image reader is moved to the position of the set value.

According to aspects of the present disclosure, further provided is an image reading apparatus comprising a platen, a document feeder configured to feed a document over the platen in a feeding direction, an image reader configured to read the document fed by the document feeder over the platen, a memory, a controller configured to control the image reader to read a reference plate over the platen at a reading position in a sub-scanning direction to generate read data, wherein the sub-scanning direction is parallel to the feeding direction, determine whether a value of a pixel in the read data is lower than or equal to a threshold value, store a value of a position of the pixel in the sub-scanning direction in the memory in response to determining the value of the pixel is lower than or equal to the threshold value, and set a value of a next reading position of the image reader in the sub-scanning direction to a value being different from the value of the position of the pixel in the sub-scanning direction in the memory, in response to determining that the value of the pixel in the read data is lower than or equal to a threshold value and storing the value of the position of the pixel in the subs-scanning direction in the memory.

BRIEF DESCRIPTION OF THE DRAWINGS

FIG. 3A is a flowchart depicting ADF reading processing.

FIGS. 4A and 4B are flowcharts depicting reading position setting processing and dust storage processing, respectively.

FIG. 5 is a flowchart depicting ADF reading processing in a second illustrative embodiment.

FIG. 6A is a flowchart depicting dust storage processing in a third illustrative embodiment.

FIG. 6B is a diagram depicting a dust storage area in the third illustrative embodiment.

FIG. 8 is a flowchart depicting reading position setting processing in the third illustrative embodiment.

FIG. 9A is a flowchart depicting power-on processing in a fourth illustrative embodiment.

DETAILED DESCRIPTION

Figure 1A:
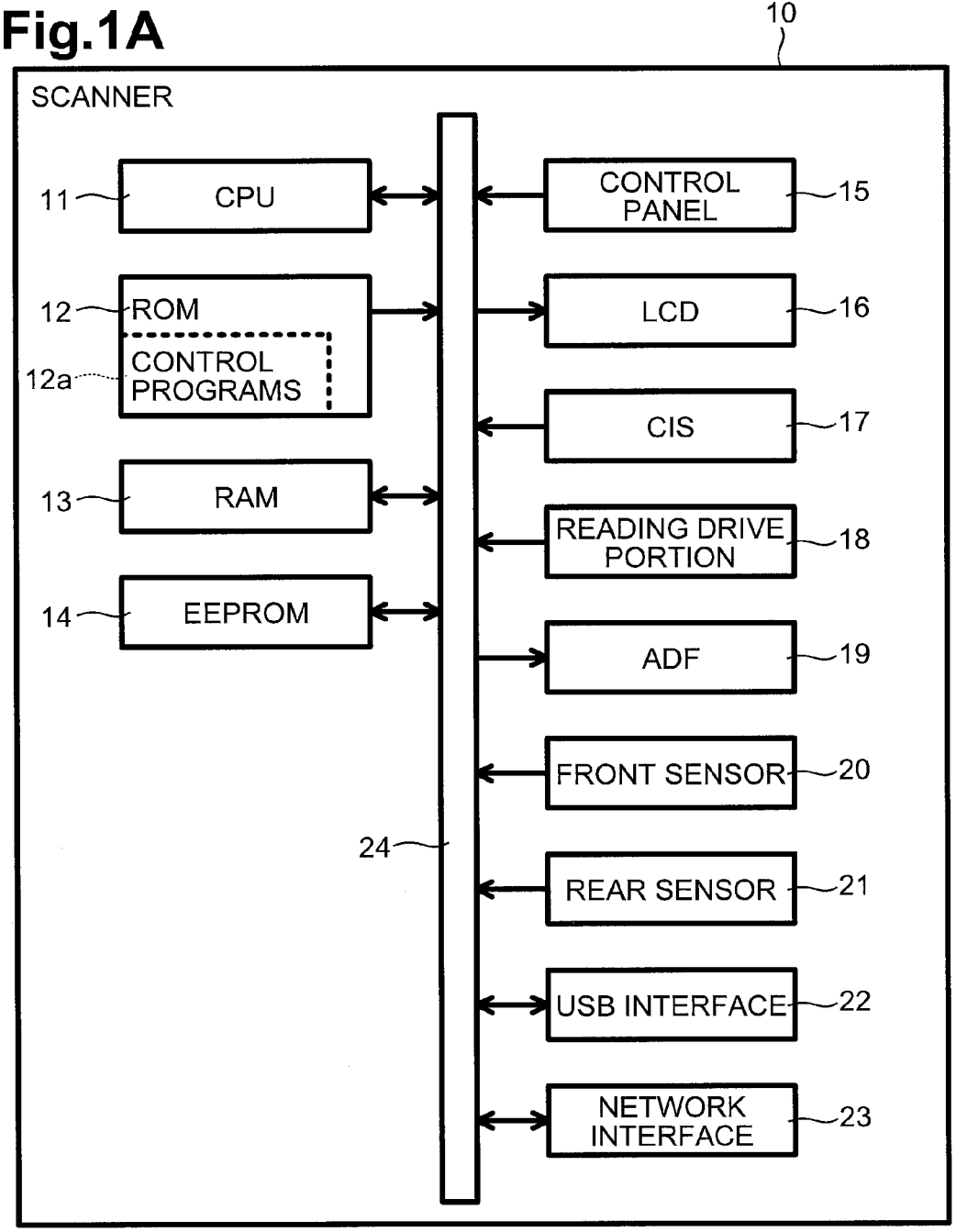
FIG. 1A is a block diagram depicting electrical configuration of a scanner in an illustrative embodiment according to one or more aspects of the disclosure.

Illustrative embodiments will be described with reference to the accompanying drawings. First, a first illustrative embodiment will be described referring to FIGS. 1A-4B. FIG. 1A is a block diagram depicting electrical configuration of an image reading apparatus, e.g., a scanner 10, according to an illustrative embodiment. As will be described in detail, the scanner 10 according to the illustrative embodiment may be configured to start a document reading quickly while preventing or reducing occurrence of an abnormal image due to, for example, dust, e.g., occurrence of a black streak extending in a sub-scanning direction in an output image.

The scanner 10 mainly includes a central processing unit (CPU) 11, a read only memory (ROM) 12, a random-access memory (RAM) 13, an electrically erasable programmable read only memory (EEPROM) 14, a control panel 15, a liquid crystal display (LCD) 16, a contact image sensor (CIS) 17, a reading drive portion 18, an automatic document feeder (ADF) 19, a front sensor 20, a rear sensor 21, a universal serial bus (USB) interface 22, and a network interface 23. These devices 11-23 are connected to each other, via a bus line 24.

The CPU 11 controls devices or components of the scanner 10, based on fixed values and programs stored in the ROM 12 and data stored in the RAM 13. The ROM 12 is a read-only memory.

The ROM 12 stores therein control programs 12a for controlling operations of the scanner 10, and constants and tables that are referred to when the control programs 12a are performed. The CPU 11 performs processing depicted in flowcharts of FIGS. 3 and 4 in accordance with the control programs 12a.

The RAM 13 is a rewritable volatile memory configured to temporarily store information necessary for processing of the CPU 11. The EEPROM 14 is a rewritable nonvolatile memory that holds its data when the power turns off. The EEPROM 14 includes a dust storage area 14a (described below).

The control panel 15 permits instructions and various settings to be input to the scanner 10. The control panel 15 includes a touch panel provided on the LCD 16, and mechanical keys. The LCD 16 is a liquid crystal display configured to display various screens.

The CIS 17 is a contact image sensor and a reader configured to read a document. The CIS 17 includes a linear image sensor including a plurality of light receiving elements linearly arranged in a main-scanning direction, a light source including three colors of red, green and blue light-emitting diodes, and a rod lens array for imaging light reflected off a document in the respective light receiving elements of the image sensor.

The main-scanning direction is parallel to a plane of platen glasses 44 and 45 (refer to FIG. 2) and perpendicular to a direction in which the CIS 17 is moved by the reading drive portion 18. The main-scanning direction is perpendicular to a document feeding direction in which a document is fed by the ADF 19 over the platen glasses 44 and 45.

The reading drive portion 18 is configured to move the CIS 17 in a sub-scanning direction. The reading drive portion 18 includes a motor, e.g., a stepping motor, and a motor drive portion configured to generate a drive signal for driving the motor stepwise. The sub-scanning direction is parallel to a document feeding direction in which a document is fed over the platen glasses 44 and 45 by the ADF 19. The sub-scanning direction is the direction indicated by an arrow F or an arrow B (refer to FIG. 2).

Figure 2:
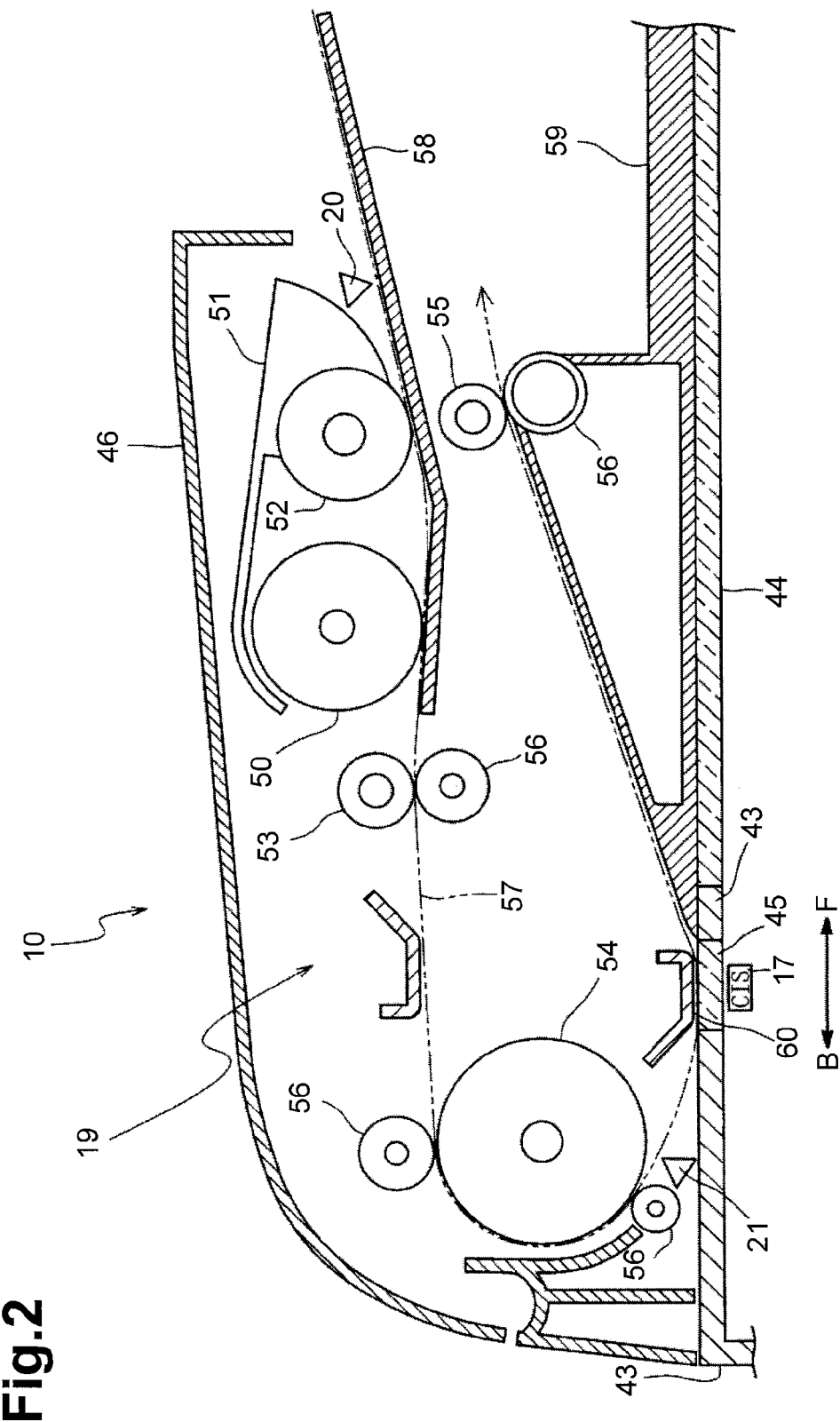
FIG. 2 is a simplified side sectional view of the scanner.

The ADF 19 is configured to feed a document set in a document tray 58 (refer to FIG. 2) to a reading position by the CIS 17 along a feeding path 57 (refer to FIG. 2). The ADF 19 is also configured to feed the document that has been read by the CIS 17 to a discharge tray 59.

The front sensor 20 is configured to detect a document set in the document tray 58. The rear sensor 21 is configured to detect the document fed by the ADF 19. Each of the front sensor 20 and the rear sensor 21 includes a photo-sensor.

Each of the front sensor 20 and the rear sensor 21 is configured to output a respective signal whose output level is different, in response to the presence or absence of a document at their respective positions. Based on the signal output from the front sensor 20 or the rear sensor 21, the scanner 10 is configured to detect the presence or absence of a document set in the document tray 58, and the presence or absence of a document at the position of the rear sensor 21.

The USB interface 23 is a well-known device for communicably connecting, via a USB plug, other devices, e.g., a storage medium such as a USB memory, a personal computer, and hard disk. The network interface 24 is an interface to allow the scanner 10 to connect to network (not depicted), e.g., local area network (LAN) and the Internet.

Figure 1B:
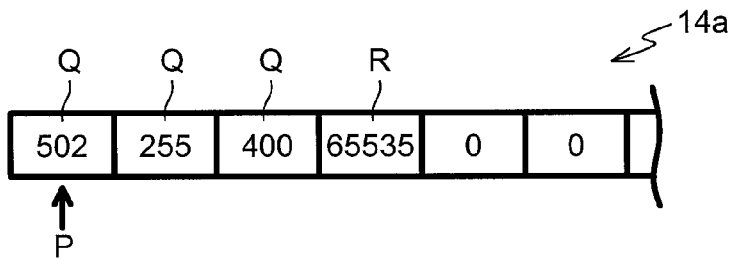
FIG. 1B is a diagram depicting a dust storage area.

FIG. 1B is a diagram depicting a dust storage area 14a provided in the EEPROM 14. When a possible object that causes an abnormal image is detected, e.g., there is a dust on the second platen glass 45, a position where such a possible object, e.g., dust, is detected (hereinafter, referred to as a "dust detected position Q") is stored in the dust storage area 14a. In the illustrative embodiment, a dust detected position Q in the sub-scanning direction (hereinafter, referred to as a "sub-scanning position") is stored in the dust storage area 14a.

A dust detected position Q is sequentially stored from a first area P of the dust storage area 14a. An end designating value R is stored in the dust storage area 14a. The end designating value R represents no more dust detected position Q is stored or exists in the dust storage area 14a. For the end designating value R, a value that cannot be taken as a dust detected position Q, e.g., "65535," is set in this illustrative embodiment. The end designating value R is stored in the first area P in an initial state of the dust storage area 14a. Every time such a possibility that causes an abnormal image is detected, a dust detected position Q is written over an area of the dust storage area 14a where the end designating value R is stored. The end designating value R is stored in an immediately following area in the dust storage area 14a.

FIG. 2 is a sectional view of a portion the scanner 10. The scanner 10 includes a casing 43 having a generally box shape. The first platen glass 44 and the second platen glass 45 are arranged at an upper portion of the casing 43.

A document cover 46 is pivotally connected to the casing 43. The document cover 46 is configured to pivotally move between a closed position in which each of the platen glasses 44 and 45 are closed, and an open position in which each of the platen glasses 44 and 45 is open. The document cover 46 is provided with the ADF 19, the document tray 58, and the discharge tray 59.

Disposed in an interior of the ADF 19 are a separation roller 50, a suction roller 52 rotatably disposed at an end portion of an arm 51 whose opposite end portion is supported by a shaft of the separation roller 50, a plurality of feeding rollers 53 and 54, a discharge roller 55, and a plurality of follower rollers 56 pressed against the rollers 53, 54, and 55. A document is fed by those rollers along a feeding path 57. The document passes through a position where the CIS 17 reads the document, and is discharged onto the discharge tray 59. The reading drive portion 18 drives the separation roller 50, the suction roller 52, the plurality of feeding rollers 53 and 54, and the discharge roller 55.

The CIS 17 is accommodated in an interior of the casing 43 of the scanner 10. When the CIS 17 reads a document fed by the ADF 19, the CIS 17 stops at a position directly below the second platen glass 45. With the position as a reading position, the CIS 17 reads a document via the second platen glass 45 while colors of the light source are sequentially changed. When the CIS 17 reads a document placed on the first platen glass 44, the CIS 17 reads the document while the CIS 17 is moved in the sub-scanning direction (e.g., direction of the arrow F or direction of the arrow B) at a constant speed using the reading drive portion 18, and colors of the light source are sequentially changed.

A white reference plate 60 is disposed across the second platen glass 45 from the CIS 17. The CIS 17 is configured to read the white reference plate 60, via the second platen glass 45. In the illustrative embodiment, the CIS 17 is configured to read the reference plate 60 after document reading, to detect such a possible object that causes an abnormal image, e.g., dust on the second platen glass 45.

The front sensor 20 functions as a sensor to detect the absence or presence of a document set in the document tray 58. The rear sensor 21 functions as a sensor to determine a start time of document reading by the CIS 17. More specifically, the scanner 10 is configured to start reading a document with the CIS 17 as the document is fed by a predetermined feeding amount after the rear sensor 21 detects a leading end of the document.

The rear sensor 21 also functions as a sensor to determine an end time of document reading by the CIS 17. More specifically, the scanner 10 is configured to finish reading a document with the CIS 17 as the document is fed by a predetermined feeding amount after the rear sensor 21 stops detecting the document.

FIG. 3A is a flowchart depicting ADF reading processing that the CPU 11 performs in accordance with the control programs 12a. In this processing, a document is read while the document is being fed using the ADF 19. The CPU 11 waits for the reception of an instruction of document reading using the ADF 19 (S301: No).

When the CPU 11 receives an instruction of document reading using the ADF 19 (S301: Yes), the CPU 11 performs reading position setting processing (S302). In the reading position setting processing (S302), a reading position of the CIS 17 in sub-scanning direction is set. As will be described in detail referring to FIG. 4A, in the reading position setting processing (S302), the reading position is set to such a position avoiding a position in which an abnormal image is likely to occur.

The CPU 11 performs preparation processing, e.g., light intensity adjustments and shading compensation (S303). The CPU 11 controls the reading drive portion 18 to move the CIS 17 in the sub-scanning direction to the reading position set in the reading position setting processing (S302) (S304). The CPU 11 starts feeding a document set on the document tray 58 using the ADF 19 (S305).

The CPU 11 waits for an ON signal to be input from the rear sensor 21 (S306: No). The rear sensor 21 outputs an OFF signal when the rear sensor 21 does not detect a document and an ON signal when the rear sensor 21 detects a document. In other words, the CPU 11 waits for the leading end of the document fed by the ADF 19 to reach a detection position by the rear sensor 21.

When the CPU 11 determines that an ON signal is input from the rear sensor 21 (S306: Yes), the CPU 11 makes a setting of a reading start counter Con (S307). The reading start counter Con is for counting the number of feeding steps required by the motor of the reading drive portion 18 to feed a document until the CIS 17 starts reading the document after the rear sensor 21 detects the leading end of the document. The number of such feeding steps is hereinafter, referred to as "the number of start waiting steps." More specifically, in S307, the CPU 11 sets a value obtained by subtracting "(Ymid−Y)" from a default value of the reading start counter Con, to the reading start counter Con.

Figure 3B:
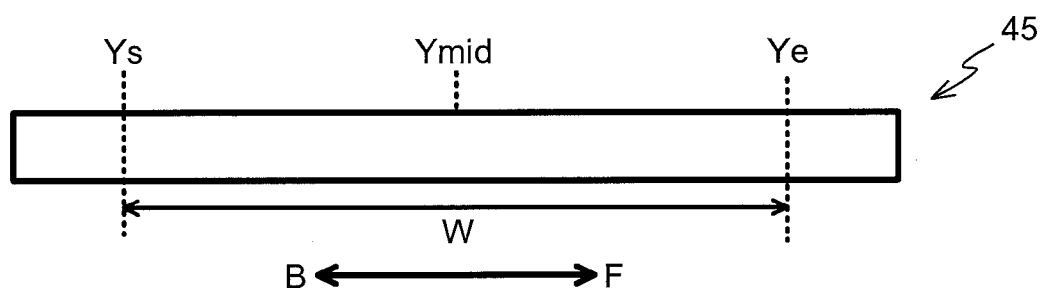
FIG. 3B is a diagram depicting a range W.

As depicted in FIG. 3B, "Ymid" is a central position of a range W in the sub-scanning direction. The range W is a predetermined portion or range of the second platen glass 45 in the sub-scanning direction (e.g., direction of the arrow F or direction of the arrow B) in which image quality is not impaired. In other words, in the range W, "Ymid" is the midpoint in the sub-scanning direction between a start point "Ys" and an end point "Ye". As the range W, a guarantee range of Modulation Transfer Function (MTF) values determined by the manufacturer of, for example, the scanner 10, e.g., a reading quality guarantee range, may be employed.

A reading position "Y" is a reading position in the sub-scanning direction set in the reading position setting processing (S302). The default reading position of the CIS 17 is "Ymid". In other words, the number of start waiting steps to be counted with the value of the reading start counter Con set in S307 represents a corrected period that is obtained by correcting the number of default start waiting steps in accordance with the reading position "Y" set in the reading position setting processing (S302). Therefore, document reading may be started at a right or proper timing regardless of a value of the reading position "Y" in a structure in which a value of the reading position "Y" set in the reading position setting processing (S302) is changed.

The CPU 11 determines whether a value of the reading start counter Con is "0" (S308). When the CPU 11 determines that a value of the reading start counter Con is not "0" (S308: No), the CPU 11 decrements the value of the reading start counter Con in accordance with document feeding (S318). The CPU 11 proceeds to S308. When the CPU 11 determines that a value of the reading start counter Con is "0" (S308: Yes), the CPU 11 starts reading the document with the CIS 17 (S309).

The CPU 11 waits for an OFF signal to be input from the rear sensor 21 (S310: No). In other words, the CPU 11 waits until the trailing end of the document fed by the ADF 19 comes out of or passes through the detection position by the rear sensor 21.

When the CPU 11 determines that an OFF signal is input from the rear sensor 21 (S310: Yes), the CPU 11 makes a setting of a reading end counter Coff (S311). The reading end counter Coff is for counting the number of feeding steps required by the motor of the reading drive portion 18 to feed a document until the CIS 17 finishes reading the document after the rear sensor 21 stops detecting the document. The number of such feeding steps is hereinafter, referred to as "the number of end waiting steps."

More specifically, in S311, the CPU 11 sets a value obtained by subtracting "(Ymid−Y)" from the default value of the reading end counter Coff, to the reading end counter Coff. In other words, the number of end waiting steps to be counted with the value of the reading end counter Coff set in S311 represents a corrected period that is obtained by correcting the number of default end waiting steps in accordance with the reading position "Y" set in the reading position setting processing (S302). Therefore, document reading may be finished at a right or proper timing regardless of a value of the reading position "Y" in a structure in which a value of the reading position "Y" set in the reading position setting processing (S302) is changed.

The CPU 11 determines whether a value of the reading end counter Coff is "0" (S312). When the CPU 11 determines that a value of the reading end counter Coff is not "0" (S312: No), the CPU 11 decrements the value of the reading end counter Coff in accordance with document feeding (S319). The CPU 11 proceeds to S312. When the CPU 11 determines that a value of the reading end counter Coff is "0" (S312: Yes), the CPU 11 finishes reading the document with the CIS 17 (S313).

The CPU 11 determines whether an ON signal is input from the front sensor 20 (S314). The front sensor 20 outputs an OFF signal when the front sensor 20 does not detect a document and outputs an ON signal when the front sensor 20 detects a document. In other words, the CPU 11 determines whether a document is set in the document tray 58.

When the CPU 11 determines that an ON signal is input from the front sensor 20 (S314: Yes), e.g., a document is set in the document tray 58, the CPU 11 proceeds to S306. The CPU 11 performs processes in S306-S313, S318, and S319 for a next document. When the CPU 11 determines that an ON signal is not input from the front sensor 20, e.g., an OFF signal is input (S314: No), the CPU 11 finishes feeding the document with the ADF 19 (S315).

After S315, the CPU 11 performs dust storage processing (S316). As will be described in detail referring to FIG. 4B, when such a possible object, e.g., dust, that causes an abnormal image is detected at a position on the second platen glass 45, the position (e.g., a dust detected position) is stored in the dust storage area 14a of the EEPROM 14 in the dust storage processing (S316). After the CPU 11 performs the dust storage processing (S316), the CPU 11 controls the reading drive portion 18 to move the CIS 17 to a predetermined standby position (S317). Then, the CPU 11 ends the ADF reading processing.

FIG. 4A is a flowchart depicting the reading position setting processing (S302). The CPU 11 determines a value of the reading position "Y" at random (S401) from values within the range W. The CPU 11 sets the value stored at the first area P of the dust storage area 14a as a variable "A" (S402). When a dust detected position Q is not stored in the dust storage area 14a, the CPU 11 skips processes in S402-S405.

The CPU 11 determines whether the value of the variable "A" is equal to the value of the reading position "Y" determined in S401 (S403). When the CPU 11 determines that the value of the variable "A" is equal to the value of the reading position "Y" (S403: Yes), the CPU 11 proceeds to S401. In other words, when the value of the reading position "Y" determined in S401 is stored in the dust storage area 14a as a dust detected position Q, the CPU 11 determines a value of the reading position "Y" at random again.

When the CPU 11 determines that the value of the variable "A" is not equal to the value of the reading position "Y" determined in S401 (S403: No), the CPU 11 sets a next value in the dust storage area 14a as the variable "A" (S404). The CPU 11 determines whether the value of the variable "A" set in S404 is equal to the end designating value R (S405). When the CPU 11 determines that the value of the variable "A" set in S404 is not equal to the end designating value R (S405: No), the CPU 11 proceeds to S403. In other words, as the value of the variable "A" set in S404 is a dust detected position Q, the CPU 11 determines whether the dust detected position Q is equal to the value of the reading position "Y" that is currently set.

When the CPU 11 determines that the value of the variable "A" set in S404 is equal to the end designating value R (S405: Yes), the CPU 11 sets the reading position "Y" to the value determined in S401 (S406), the CPU 11 ends the reading position setting processing.

In the reading position setting processing (S302), the reading position of the CIS 17 is set to a position avoiding a dust detected position Q. The reading position of the CIS 17 falls within the range W that is predetermined as a range in which image quality is not impaired. Therefore, deterioration of an image quality due to the dust detected position Q avoided may be restricted. A value of the reading position "Y" is determined at random, so that the probability to avoid a dust detected position Q at an early stage in the reading position setting processing may be increased. Thus, a value of the reading position "Y" may be determined quickly.

FIG. 4B is a flowchart depicting the dust storage processing (S316). The CPU 11 sets a dust detection flag to "0" (S421). "The dust detection flag" is a flag specifying whether such a possibility that causes an abnormal image, e.g., a foreign matter such as dust on the second platen glass 45, is detected. The dust detection flag is stored in the RAM 13. One ("1") set to the dust detection flag represents that dust is detected. Zero ("0") set to the dust detection flag represents that dust is not detected.

The CPU 11 controls the CIS 17 to read the white reference plate 60 disposed at a position to oppose the CIS 17, via the second platen glass 45, for one line at the reading position "Y" that is currently set (S422). The reference plate 60 is not limited to a white reference plate but may be a gray reference plate. The CPU 11 sets a first pixel in a line of pixels which extends in the main-scanning direction in image data obtained by the reading in S422 as a subject pixel (S423). All pixels in the line have a same value of position in the sub-scanning direction.

The CPU 11 determines whether a value of the subject pixel exceeds a threshold value (S424). When the CPU 11 determines that a value of the subject pixel does not exceed the threshold value (S424: No), the CPU 11 determines that the image data obtained by reading the reference plate 60 has an abnormality, e.g., such a possibility that causes an abnormal image is detected, the CPU 11 sets the dust detection flag to "1" (S425). Then, the CPU 11 proceeds to S426. When the CPU 11 determines that a value of the subject pixel exceeds the threshold value (S424: Yes), the CPU 11 skips the process in S425 and proceeds to S426.

In S426, the CPU 11 determines whether determination of S424 is made for all the pixels of the image data obtained by the reading in S422 (S426). When the CPU 11 denies the determination in S426 (S426: No), the CPU 11 sets a next pixel in the line of pixels as a subject pixel (S429). Then, the CPU 11 proceeds to S424.

When the CPU 11 affirms the determination in S426 (S426: Yes), the CPU 11 determines whether the dust detection flag is set to "1" (S427). When the CPU 11 determines that the dust detection flag is not set to "1" (S427: No), the CPU 11 ends the dust storage processing. If the dust detection flag is set to "1", that means there is at least one pixel in the line whose value does not exceed the threshold value.

When the CPU 11 determines that the dust detection flag is set to "1" (S427: Yes), the CPU 11 stores, in the dust storage area 14a, a sub-scanning position with respect to a position of such a possibility that causes an abnormal image, e.g., a position of a pixel whose value do not exceed the threshold value, as a dust detected position Q (S428). The CPU 11 ends the dust storage processing.

According to the first illustrative embodiment, a dust detected position Q detected in a period after document reading is reflected on a reading position of the CIS 17 in the next and subsequent readings. Therefore, document reading may be started quickly while occurrence of an abnormal image due to dust is prevented or reduced. Every time the CPU 11 receives a reading instruction, e.g., for every reading job, the CPU 11 sets the reading position of the CIS 17 to avoid a position in which an abnormal image is likely to occur. Therefore, every reading job may be favorably performed.

Next, a second illustrative embodiment will be described referring to FIG. 5. In the first illustrative embodiment, for every reading job, a reading position of the CIS 17 is set to avoid a position in which an abnormal image is likely to occur. Alternatively, in the second illustrative embodiment, a position in which an abnormal image is likely to occur is detected for every document reading of one page. The detected position is reflected on document reading of the next page.

Like reference numerals denote like corresponding parts and detailed description thereof with respect to the second illustrative embodiment may be omitted herein. FIG. 5 is a flowchart depicting ADF reading processing according to the second illustrative embodiment. The CPU 11 performs the ADF reading processing in accordance with a control program 12a of the second illustrative embodiment.

Differences from the ADF reading processing (FIG. 3A) according to the first illustrative embodiment will be mainly described. When the CPU 11 determines that an ON signal is input from the front sensor 20 after document reading for one page is completed (S314: Yes), the CPU 11 performs dust storage processing (S501). The dust storage processing (S501) is similar processing to the above-described dust storage processing (S316).

Thereafter, the CPU 11 performs reading position setting processing (S502). The reading position setting processing (S502) is similar processing to the above-described reading position setting processing (S302). The CPU 11 controls the reading drive portion 18 to move the CIS 17 in sub-scanning direction to the reading position set in the reading position setting processing (S502) (S503). The CPU 11 proceeds to S306 after S503.

According to the second illustrative embodiment, a reading position of the CIS 17 may be set to a position avoiding a dust detected position Q for every reading of one page. Therefore, even when dust adheres to the second platen glass 45 at the time of reading one page of a document, an influence of the dust may be avoided. Thus, each page of a document may be read preferably.

Next, a third illustrative embodiment will be described referring to FIGS. 6-8. In the first illustrative embodiment, a position of a dust detected position Q in the main-scanning direction (hereinafter, referred to as a "main-scanning position") is not considered. In the third illustrative embodiment, a dust detected position Q in the main-scanning position is taken into consideration. Like reference numerals denote like corresponding parts and detailed description thereof with respect to the third illustrative embodiment may be omitted herein. The CPU 11 performs each of the processing depicted in the respective flowcharts of FIGS. 6-8, in accordance with a control program 12a of the third illustrative embodiment.

Figure 6B:
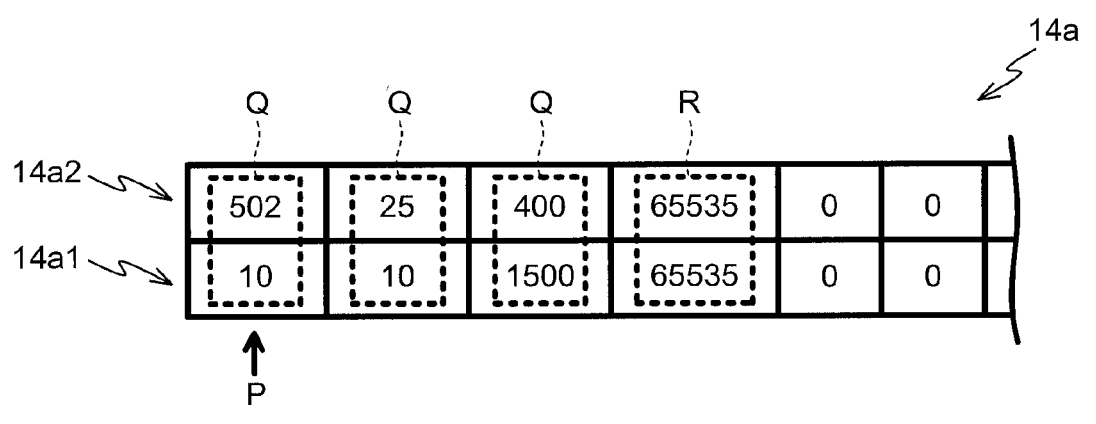

FIG. 6A is a flowchart depicting dust storage processing according to the third illustrative embodiment (S316). In the third illustrative embodiment, as depicted in FIG. 6B, the dust storage area 14a provided in the EEPROM 14 includes a first area 14a1 and a second area 14a2 in which a main-scanning position and a sub-scanning position with respect to a dust detected position Q is stored, respectively.

In the third illustrative embodiment, a position of a dust detected position Q in the main-scanning direction (e.g., a main-scanning position) and a position of the dust detected position Q in the sub-scanning direction (e.g., a sub-scanning position) are stored in the first area 14a1 and the second area 14a2, respectively, sequentially from the first area P. In other words, values stored in K-th place from the first area P in the respective first area 14a1 and the second area 14a2 represent the main-scanning position and the sub-scanning position, respectively, with respect to one dust detected position Q. Similar to the first illustrative embodiment, the end designating value R is stored in each of the first area 14a1 and the second area 14a2.

Differences between the dust storage processing (FIG. 4B) of the first illustrative embodiment and a dust storage processing of the third illustrative embodiment (FIG. 6A) will be mainly described. In S427, when the CPU 11 determines that the dust detection flag is set to "1" (S427: Yes), the CPU 11 stores a main-scanning position BX and a sub-scanning position BY of a pixel whose value does not exceed the threshold value in the RAM 13 (S601 and S602).

The CPU 11 performs a CIS element damage determination processing (S603). As will be described in detail referring to FIG. 7, in the CIS element damage determination processing (S603), the CPU 11 determines whether an abnormality in image data obtained by reading the reference plate 60 is attributable to an abnormality of a light receiving element of the image sensor of the CIS 17.

In the CIS element damage determination processing (S603), when the CPU 11 determines that an abnormality in the image data is not attributable to damage on a light receiving element (S604: No), the CPU 11 stores, in the first area 14a1 of the dust storage area 14a, a main-scanning position BX stored in the RAM 13 (S605). Thereafter, the CPU 11 stores, in the second area 14a2 of the dust storage area 14a, a sub-scanning position BY stored in the RAM 13 (S606). Then, the CPU 11 ends the dust storage processing.

In the CIS element damage determination processing (S603), when the CPU 11 determines that an abnormality of the image data is attributable to damage on a light receiving element (S604: Yes), the CPU 11 performs a predetermined error notification, e.g., indication or display of an error in the display unit 16 (S607). Then, the CPU 11 ends the dust storage processing.

In S604-S607, when the CPU 11 determines that an abnormality of the image data is attributable to damage of a light receiving element, a position where the abnormality is detected is not stored in the dust storage area 14a. When an abnormality of the image data is attributable to damage of a light receiving element, occurrence of an abnormal image will not be prevented even if a reading position is set to avoid a position of the abnormality detected. Therefore, in this case, a main-scanning position BX and a sub-scanning position BY are not stored in the dust storage area 14a, so that consumption of the storage capacity of the EEPROM 14 may be reduced. In this case, an error notification may be provided. Accordingly, the scanner 10 may be dispatched for repair soon, and restored to its normal condition early.

Figure 7:
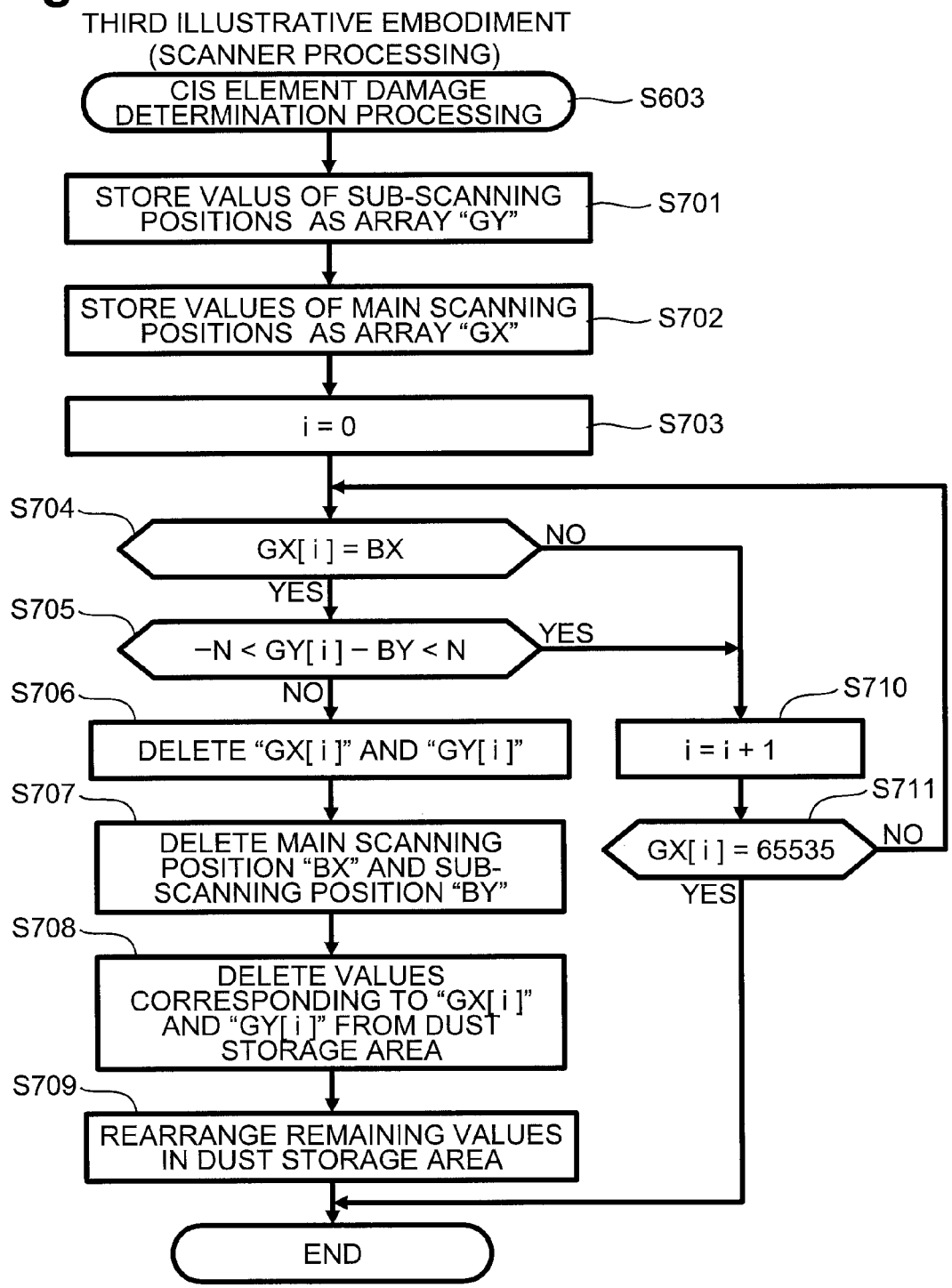
FIG. 7 is a flowchart depicting CIS element damage determination processing.

FIG. 7 is a flowchart depicting the CIS element damage determination processing (S603). The CPU 11 stores values of sub-scanning positions BY as an array GY in the RAM 13 (S701). The CPU 11 stores values of main-scanning positions BX as an array GX in the RAM 13 (S702).

The CPU 11 sets a variable "i" to "0" (S703). The CPU 11 determines whether the value of "GX[i]" in the array GX is equal to a value of the main-scanning position BX stored in the EEPROM 14 in S605 of previous dust storage processing (S704). When the CPU 11 determines that both values are equal (S704: Yes), the CPU 11 determines whether "−N<GY[i]−BY<N" is satisfied (S705). The unit of a threshold value N is given in pixels. In other words, the CPU 11 determines whether distance between GY[i] in the array GY and a sub-scanning position BY stored in the EEPROM 14 in S606 of previous dust storage processing is less than N pixels. The threshold value N varies according to values of the reading resolutions. For example, when a reading resolution is 300 dpi, "N=10" (pixels) and when the reading resolution is 600 dpi, "N=20" (pixels).

When the CPU 11 determines that "−N<GY[i]−BY<N" is not satisfied, e.g., distance between "GY[i]" and the sub-scanning position BY is spaced apart by "N" pixels or greater (S705: No), the CPU 11 determines that abnormalities of the image data at a position specified by "GX[i]" and "GY[i]", and at a position specified by the values of the main-scanning position BX and the sub-scanning position BY are attributable to damages of light receiving elements. In this case, the CPU 11 performs processes in S706-S709, and ends the CIS element damage determination processing.

More specifically, the CPU 11 deletes "GX[i]" and "GY[i]" from the arrays GX and GY, respectively (S706). The CPU 11 deletes the values of the main-scanning position BX and the sub-scanning position BY from the RAM 13 (S707). The CPU 11 deletes, from the first area 14a1 and the second area 14a2 of the dust storage area 14a, the values corresponding to the respective "GX[i]" and "GY[i]" deleted in S706 (S708). The CPU 11 rearranges values in the first area 14a1 and the second area 14a2 of the dust storage area 14a, to next areas therein closer to the respective first areas P (S709).

When the CPU 11 determines that the value of "GX[i]" and a value of the main-scanning position BX are not equal (S704: No), the CPU 11 proceeds to S710. When the CPU 11 determines that "−N<GY[i]−BY<N" is satisfied (S705: Yes), the CPU 11 proceeds to S710.

In S710, the CPU 11 adds "1" to the variable "i" (S710). The CPU 11 determines whether the value of "GX[i]" is the end designating value R of "65535" (S711). When the CPU 11 determines that the value of "GX[i]" is not "65535" (S711: No), the CPU 11 proceeds to S704. When the CPU 11 determines that the value of "GX[i]" is "65535" (S711: Yes), the CPU 11 ends the CIS element damage determination processing.

In the CIS element damage determination processing (S603), the CPU 11 determines that a light receiving element is damaged when a position same as a main-scanning position BX with respect to the main-scanning direction, and a position spaced apart by the threshold value N or greater from a sub-scanning position BY are stored, as a dust detected position Q, in the first area 14a1 and the second area 14a2 of the dust storage area 14a, respectively.

When there exists a plurality of combinations of a main-scanning position BX and a sub-scanning position BY, the CPU 11 determines for each combination, whether a value of "GX[i]" and a value of a main-scanning position BX are the same, and distance between a value of GY[i] and a value of a sub-scanning direction BY is spaced apart by the threshold value N or greater. When the CPU 11 affirms the determination, the CPU 11 determines that a light receiving element is damaged.

FIG. 8 is a flowchart depicting reading position setting processing (S302), according to the third illustrative embodiment. The CPU 11 stores values of sub-scanning positions BY stored in the second area 14a2 of the dust storage area 14a, as an array GY in the RAM 13 (S801). The CPU 11 stores values of main-scanning positions BX stored in the first area 14a1 of the dust storage area 14a, as an array GX in the RAM 13 (S802). In the reading position setting processing according to the third illustrative embodiment, when any dust detected position Q is not stored in the dust storage area 14a, the CPU 11 performs S810 and S817.

The CPU 11 sorts the array GY in an ascending order (S803). The CPU 11 sorts the array GX in accordance with the array GY (S804). The CPU 11 sets variables "i" and "j" to "0" (S805).

The CPU 11 determines whether "N>GY[i+1]−GY[i]" is satisfied (S806). The threshold value "N" is the same threshold value used in S705 of the CIS element damage determination processing (FIG. 7). Therefore, the CPU 11 determines whether the distance between adjacent positions in the array GY sorted in ascending order in S806 is less than "N" pixels.

When the CPU 11 determines that "N>GY[i+1]−GY[i]" is not satisfied (S806: No), the CPU 11 sets the value of GY[i] as a value of "GA[j]" in an array GA (S807). The array GA is an array representing sub-scanning positions with respect to dust detected positions Q that are rearranged in consideration of distance between dust detected positions Q. The array GA is stored in the RAM 13. After step S807, the CPU 11 adds "1" to each of values of the variables "i" and "j" (S808). Then, the CPU 11 proceeds to S809.

When the CPU 11 determines that "N>GY[i+1]−GY[i]" is satisfied (S806: Yes), the CPU 11 determines whether "M>GX[i+1]−GX[i]" is satisfied (S818). The unit of a threshold value "M" is given in pixels, similar to the threshold value "N". The threshold value M varies according to values of reading resolutions. For example, when the reading resolution is 300 dpi, "M=10" (pixels) and when the reading resolution is 600 dpi, "M=20" (pixels).

When the CPU 11 determines that "M>GX[i+1]−GX[i]" is not satisfied (S818: No), the CPU 11 proceeds to S807. When the CPU 11 determines that "M>GX[i+1]−GX[i]" is satisfied (S818: Yes), the CPU 11 determines that a dust detected position Q specified by "GY[i]" and "GX[i]" and a dust detected position Q specified by "GY[i+1]" and "GX[i+1]" are based on one lump of dust. In this case, the CPU 11 performs S819-S821.

More specifically, the CPU 11 sets "(GY[i+1]+GY[i]−N)/2" as "GA[j]" (S819). The CPU 11 sets "65534" to "GA[j+1]" (S820). The CPU 11 sets "(GY[i+1]+GY[i]+N)/2" as "GA[j+2]" (S821).

The value "65534" set in "GA[j+1]" in S820 represents that a range from "GA[j]" to "GA[j+2]" is a series of dust areas. Such value is hereinafter, referred to as a "continuous area designation value." As a continuous area designation value, such a value that cannot be taken as a dust detected position Q, e.g., "65534" is employed.

Therefore, in S819-S821, when the distance between "GY[i]" and "GY[i+1]" is shorter than "N" pixels, and the distance between "GX[i]" and "GX[i+1]" is shorter than "M" pixels, the CPU 11 sets, in the array GA, that a range of ±(N/2) from the center between "GY[i]" and "GY[i+1]" in the sub-scanning direction is a series of dust areas. The CPU 11 adds "1" to each of values of the variables "i" and "j" (S822) after step S821. Then, the CPU 11 proceeds to S809.

In S809, the CPU 11 determines whether the value of GY[i] is "65535", which is the end designating value R (S809). When the CPU 11 determines that the value of "GY[i]" is not "65535" (S809: No), the CPU 11 proceeds to S806. When the CPU 11 determines that the value of "GY[i]" is "65535" (S809: Yes), the CPU 11, similar to S401 (S810).

The CPU 11 sets the variable "j" to "0" (S811). The CPU 11 determines whether the value of "GA[j]" in the array GA is equal to the value of the reading position "Y" determined in S810 (S812). When the CPU 11 determines that the value of "GA[j]" in the array GA is equal to the value of the reading position "Y" determined in S810 (S812: Yes), the CPU 11 proceeds to S810. In other words, when the value of the reading position "Y" determined in S810 is stored in the array GA, the CPU 11 again determines a value of the reading position "Y" at random.

When the CPU 11 determines that that the value of GA[j] is not equal to the value of the reading position "Y" determined in S810 (S812: No), the CPU 11 determines whether the value of "GA[j]" is the continuous area designation value (e.g., "65534" in this illustrative embodiment) (S813). When the CPU 11 determines that "GA[j]=65534" (S813: Yes), the CPU 11 determines whether "GA[j−1]<Y<GA[j+1]" is satisfied (S814).

When the CPU 11 determines that "GA[j−1]<Y<GA[j+1]" is satisfied (S814: Yes), the CPU 11 proceeds to S810. In other words, when the value of the reading position "Y" determined in S810 falls within values of a series of dust areas specified by the continuous area designation value, the CPU 11 determines a value of the reading position "Y" at random again. With respect to two dust detected positions Q, distance between main-scanning positions thereof is less than or equal to the predetermined distance, and distance between sub-scanning positions thereof is less than or equal to is less than or equal to the predetermined distance, a position between the two dust detected positions Q are removed from consideration as a reading position of the CIS 17 in S814.

When the CPU 11 determines that "GA[j−1]<Y<GA[j+1]" is not satisfied (S814: No), the CPU 11 proceeds to S815. In S813, when the CPU 11 determines that the value of "GA[j]" is not "65534" (S813: No), the CPU 11 proceeds to S815.

In S815, the CPU 11 adds "1" to the value of the variable "j" (S815). The CPU 11 determines whether the value of "GA[j]" is "65535" of the end designating value R (S816). When the CPU 11 determines that the value of "GA[j]" is not "65535" (S816: No), the CPU 11 proceeds to S812. In other words, the CPU 11 performs S812-S814 for a next value in the array GA. When the CPU 11 determines that the value of "GA[j]" is "65535" (S816: Yes), the CPU 11 sets the reading position "Y" to the value determined in S810 (S817). Then, the CPU 11 ends the reading position setting processing.

According to the third illustrative embodiment, occurrence of an abnormal image may be reduced more favorably because, with respect to a dust detected position Q, not only a sub-scanning position but also a main-scanning position are taken into consideration. Contamination of the platen, e.g., the second platen glass 45, and damage on a light receiving element of the CIS 17 may be differentiated because a main-scanning position is taken into consideration.

Two dust detected positions Q closer to each other may be attributable to a common or the same dust. Therefore, when the distance between the two dust detected positions Q is short, a position between the dust detected positions Q may be removed from consideration as a reading position of the CIS 17. Thus, occurrence of an abnormal image may be favorably prevented or reduced.

Next, a fourth illustrative embodiment will be described referring to FIG. 9A. In the fourth illustrative embodiment, at a timing when the power of the scanner 10 is switched ON, the CPU 11 detects a position in which an abnormal image is likely to occur. Like reference numerals denote like corresponding parts and detailed description thereof with respect to the fourth illustrative embodiment may be omitted herein.

FIG. 9A is a flowchart depicting power-on processing. The processing is started when the power of the scanner 10 is switched from OFF to ON. The CPU 11 performs the power-on processing in accordance with a control program 12a of the fourth illustrative embodiment. The CPU 11 is configured not to receive a reading instruction while the power-on processing is performed.

The CPU 11 performs initialization processing (S901). In the initialization processing, for example, the CIS 17 is set in an initial position and a document remaining in the ADF 19 is ejected. The CPU 11 performs reading position setting processing (S902). The reading position setting processing (S902) is similar to the reading position setting processing (S302). The CPU 11 controls the reading drive portion 18 to move the CIS 17 to the reading position set in the reading position setting processing (S902) (S903).

The CPU 11 performs dust storage processing (S904). The dust storage processing (S904) is similar to the dust storage processing (S316). The CPU 11 controls the reading drive portion 18 to move the CIS 17 to a predetermined standby position (S905). The CPU 11 ends the power-on processing.

According to the fourth illustrative embodiment, a position in which an abnormal image is likely to occur, is detected before a reading instruction is provided, at a timing when the power of the scanner 10 is switched ON. Therefore, document reading may be preferably performed based on a first reading instruction after the power of the scanner 10 is switched ON.

Next, a fifth illustrative embodiment will be described referring to FIG. 9B. In the fifth illustrative embodiment, a position in which an abnormal image is likely to occur is detected at a predetermined timing. Like reference numerals denote like corresponding parts and detailed description thereof with respect to the fifth illustrative embodiment may be omitted herein.

Figure 9B:
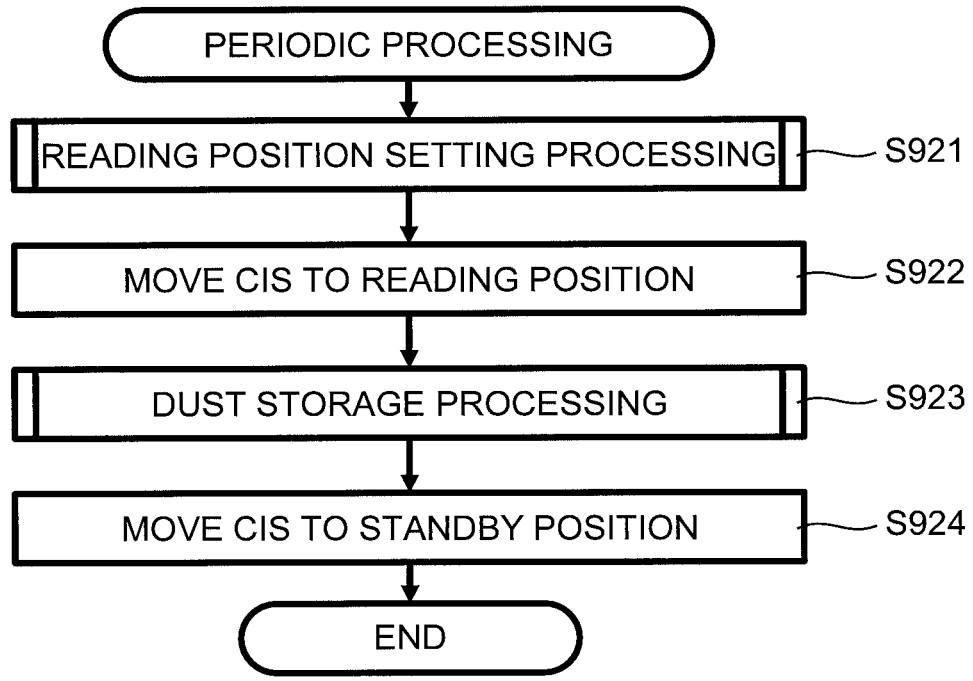
FIG. 9B is a flowchart depicting periodic processing in a fifth illustrative embodiment.

FIG. 9B is a flowchart depicting periodic processing. The processing is started at every predetermined period (e.g., every day). The CPU 11 performs the periodic processing in accordance with a control program 12a of the fifth illustrative embodiment.

The CPU 11 performs reading position setting processing (S921). The reading position setting processing (S921) is similar to the reading position setting processing (S302). The CPU 11 controls the reading drive portion 18 to move the CIS 17 to the reading position set in the reading position setting processing (S921) (S922).

The CPU 11 performs dust storage processing (S923). The dust storage processing (S923) is similar to the dust storage processing (S316). The CPU 11 controls the reading drive portion 18 to move the CIS 17 to a predetermined standby position (S924). Then, the CPU 11 ends the periodic processing.

In the fifth illustrative embodiment, a position in which an abnormal image is likely to occur is detected at a regular timing before a reading instruction is provided. Therefore, a dust detected position Q may be stored in the dust detection area 14a at a regular timing. Therefore, document reading may be performed favorably based on a reading instruction. In another embodiment, for example, the periodic processing may be performed at a predetermined timing when the document cover 46 is in an open position.

While the disclosure has been described in detail with reference to the specific embodiments thereof, this is merely an example, and various changes, arrangements and modifications may be applied therein without departing from the spirit and scope of the disclosure.

For example, in the above-described illustrative embodiments, the scanner 10 is an example of an image reading apparatus. The disclosure may be applied to various apparatus, e.g., multi-functional device, configured to perform document reading using an ADF.

In the third illustrative embodiment, with respect to two dust detected positions Q, when the distance between main-scanning positions thereof is less than or equal to a predetermined distance, and the distance between sub-scanning positions thereof is less than or equal to a predetermined distance, a portion between the two dust detected positions Q is excluded from reading positions of the CIS 17. Alternatively, with respect to two dust detected positions Q, when either one of the distance between main-scanning positions thereof and the distance between sub-scanning positions thereof is less than or equal to a predetermined distance, a portion between the two dust detected positions Q may be excluded from reading positions of the CIS 17.

In the above-described illustrative embodiments, a reading position of the CIS 17 is set in the range W which is predetermined as a range in which image quality is not impaired. In another embodiment, when an area to avoid a dust detected position Q in the sub-scanning direction does not exist in the range W, a reading position of the CIS 17 may be set in an area of the second platen glass 45 in the sub-scanning direction outside the range W. Therefore, even when an area to avoid a dust detected position Q in the sub-scanning direction does not exist in the range W, such a situation that document reading is not performed may be prevented or reduced.

In the above-described illustrative embodiments, the CPU 11 performs the respective processing depicted in FIGS. 3A, 4, 5, 6A, and 7-9. In another embodiment, a plurality of CPUs may perform the processing in cooperation with each other. An integrated circuit (IC), e.g., an ASIC, may perform the processing or a plurality of ASICs may perform the processing in cooperation with each other. The CPU 11 and an IC, e.g., an ASIC, may perform the processing in cooperation with each other.

A portion of the processing depicted in FIGS. 3A, 4, 5, 6A, 7-9 may be omitted or changed without departing from the scope of the disclosure. For example, S307 in FIG. 3A may be performed before S305. Features described in conjunction with the respective illustrative embodiments and the above-described modifications may be combined appropriately.

One or more aspects of the disclosure may be accomplished in various manners, for example, using a control device configured to control the image reading apparatus, an image reading system, an image reading method, image reading programs, or recording medium storing image reading programs, such as non-transitory computer readable media having computer readable instructions thereon.

One or more aspects of the disclosure are to provide an image reading apparatus and non-transitory computer readable medium in which document reading may be started quickly while occurrence of an abnormal image due to, for example, dust, is prevented or reduced.

What is claimed is:

1. An image reading apparatus comprising:
a document feeder configured to feed a document in a feeding direction;
a platen;
an image reader;
a drive unit configured to move the image reader within a predetermined range in a sub-scanning direction parallel to the feeding direction;
a memory; and
a controller configured to:
control the image reader to read the document fed by the document feeder over the platen at a reading position;
control the image reader to read a reference plate over the platen at the reading position, to generate read data;
determine whether the read data has an abnormality;
store a value of the reading position of the image reader in the sub-scanning direction in the memory in response to determining that the read data has an abnormality;
set a value of a position of the image reader in the sub-scanning direction to a value being different from the stored value within the predetermined range in response to determining that the read data has an abnormality and in response to receiving a reading instruction of another document, by:
selecting a value of a position of the image reader in the sub-scanning direction within the predetermined range at random in response to receiving the reading instruction;
determining whether the selected value is equal to the stored value;
in response to determining that the selected value is not equal to the stored value, setting the value of the position of the image reader in the sub-scanning direction to the selected value; and
in response to determining that the selected value is equal to the stored value, selecting the value of the position of the image reader in the sub-scanning direction within the predetermined range at random again;
control the drive unit to move the image reader to the position of the set value; and
control the image reader to read the other document fed by the document feeder over the platen after the image reader is moved to the position of the set value.

2. The image reading apparatus according to claim 1, wherein the controller is further configured to determine whether the read data has an abnormality by comparing the read data with a reference data, determining whether the read data is different from the reference data and determining whether the read data has an abnormality in response to determining the read data is different from the reference data.

3. The image reading apparatus according to claim 1, wherein the controller is further configured to change the time to start reading the other document based upon the set value.

4. The image reading apparatus according to claim 1, wherein the controller is further configured to:
control the image reader to read documents fed by the document feeder over the platen at another reading position;
control the image reader to read the reference plate at the other reading position, to generate other read data;
determine whether the other read data has an abnormality; and
store a second value of the other reading position of the image reader in the sub-scanning direction in the memory in response to determining that the other read data has an abnormality, the second stored value being different from the stored value in the sub-scanning direction,
wherein, when a distance between the reading position and the other reading position in the sub-scanning direction is less than or equal to a predetermined distance, the set value is different from any of one or more values of positions between the stored value and the second stored value inclusive.

5. The image reading apparatus according to claim 1, wherein the controller is further configured to:
store, at every determining that the read data has an abnormality, the value of the reading position of the image reader in the sub-scanning direction with a corresponding value of the reading position in a main-scanning direction in the memory in response to determining that the read data has an abnormality, the main-scanning direction being perpendicular to the sub-scanning direction; and
set, when a first position and a second position different from the first position are stored in the memory and when distance between the first position and the second position in the sub-scanning direction is less than or equal to a predetermined distance and when distance between the first position and the second position in the main-scanning direction is less than or equal to a predetermined distance, the value of the position of the image reader in the sub-scanning direction to a value being different from any of one or more values of positions between the first position and the second position inclusive in the sub-scanning direction.

6. The image reading apparatus according to claim 1, wherein the controller is further configured to store, at every determining that the read data has an abnormality, the value of the reading position of the image reader in the sub-scanning direction with a corresponding value of the reading position in a main-scanning direction in the memory in response to determining that the read data has an abnormality, the main-scanning direction being perpendicular to the sub-scanning direction; and
wherein, when a plurality of values of the reading positions in the sub-scanning direction with a plurality of values of the reading positions are stored in the memory and when the plurality of the stored values of the reading positions in the sub-scanning direction are different and when the plurality of the stored values of the reading positions in the main-scanning direction are equal, the controller is further configured to delete the plurality of the stored values from the memory.

7. The image reading apparatus according to claim 1, further comprising a tray and a sheet sensor configured to sense a sheet on the tray,
wherein, when a plurality of documents are stacked on the tray, the controller is further configured to determine whether the read data has the abnormality after each of the plurality of documents is read by the image reader in accordance with sensing of the sheet sensor, and
wherein the controller is further configured to set the value of the position of the image reader in the sub-scanning direction to the set value in response to reading each of the plurality of documents.

8. The image reading apparatus according to claim 1, wherein the controller is further configured to, after power of the image reading apparatus is switched ON and before the controller receives the instruction of document reading of the other document, determine whether the read data has the abnormality.

9. The image reading apparatus according to claim 1, wherein the controller is further configured to determine whether the read data has the abnormality at a regular interval.

10. The image reading apparatus according to claim 1, wherein the controller is further configured to determine whether the read data has the abnormality based upon whether the controller determines a value of a pixel in the read data does not exceed a threshold value.

11. An image reading apparatus comprising:
a platen;
a document feeder configured to feed a document over the platen in a feeding direction;
an image reader configured to read the document fed by the document feeder over the platen;
a memory; and
a controller configured to:
control the image reader to read a reference plate arranged over the platen at a reading position in a sub-scanning direction to generate read data, wherein the sub-scanning direction is parallel to the feeding direction;
determine whether a value of a pixel in the read data is lower than or equal to a threshold value;
store a value of a position of the pixel in the sub-scanning direction in the memory in response to determining the value of the pixel is lower than or equal to the threshold value; and
set a value of a next reading position of the image reader in the sub-scanning direction to a value being different from the value of the position of the pixel in the sub-scanning direction in the memory, in response to determining that the value of the pixel in the read data is lower than or equal to the threshold value and storing the value of the position of the pixel in the sub-scanning direction in the memory, by:
selecting a value of the next reading position of the image reader in the sub-scanning direction within a predetermined range at random;
determining whether the selected value of the next reading position is equal to the stored value of the position of the pixel in the memory; and
in response to determining that the selected value of the next reading position is not equal to the stored value of the position of the pixel in the memory, setting the value of the next reading position of the image reader in the sub-scanning direction to the selected value of the next reading position; and
in response to determining that the selected value of the next reading position is equal to the stored value of the position of the pixel in the memory, selecting another value of the next reading position of the image reader in the sub-scanning direction within the predetermined range at random again.

12. The image reading apparatus according to claim 11, further comprising a drive unit configured to move the image reader in the sub-scanning direction,
wherein the controller is further configured to:
control the drive unit to move the image reader to the next reading position; and
control the image reader to read another document at the next reading position.

13. The image reading apparatus according to claim 11, wherein the controller is further configured to:
determine, when a value of a first position of the image reader in the sub-scanning direction and a value of a second position of the image reader in the sub-scanning direction are stored in the memory, whether a distance between the first position and the second position in the sub-scanning direction is less than or equal to a predetermined distance; and set, in response to determining the distance between the first position and the second position in the sub-scanning direction is less than or equal to the predetermined distance, the value of the next reading position of the image reader in the sub-scanning direction to the set value being different from any of one or more values of positions between the first position and the second position inclusive in the sub-scanning direction.

14. The image reading apparatus according to claim 11, wherein the controller is further configured to:

determine, at every controlling of the image reader to read the reference plate arranged over the platen at the reading position in the sub-scanning direction, whether values of a plurality of the pixels in the read data are lower than or equal to the threshold value;

store, at every determining at least one of the values of at least one of the plurality of the pixels is lower than or equal to the threshold value, at least one value of the at least one position in a main-scanning direction and at least one value of the at least one position in the sub-scanning direction in the memory, the main-scanning direction being perpendicular to the sub-scanning direction; determine, when a value of a first position of one of the pixels and a value of a second position of another of the pixels are stored in the memory, a distance between the first position and the second position in the sub-scanning direction is less than or equal to a predetermined distance and a distance between the first position and the second position in the main-scanning direction is less than or equal to another predetermined distance; and set, in response to determining the distance between the first position and the second position in the sub-scanning direction is less than or equal to the predetermined distance and the distance between the first position and the second position in the main-scanning direction is less than or equal to the other predetermined distance, the value of the next reading position of the image reader in the sub-scanning direction to the set value being different from any of one or more values of positions between the first position and the second position inclusive in the sub-scanning direction.

15. The image reading apparatus according to claim 14, wherein the controller is configured to:

determine, when a plurality of values of the positions of the pixels are stored in the memory, whether values of any at least two of the positions of the pixels in the sub-scanning direction in the memory are different and values of the at least two of the positions of the pixels in the main-scanning direction in the memory are equal; and delete, in response to determining the values of the at least two of the positions of the pixels in the sub-scanning direction in the memory are different and the values of the at least two of the positions of the pixels in the main-scanning direction in the memory are equal, the values of the at least two of the positions of the pixels in the sub-scanning direction and the values of the at least two of the positions of the pixels in the main-scanning direction from the memory.

16. An image reading apparatus comprising:

a document tray;

a sensor configured to detect whether a document is set in the document tray;

a document feeder configured to feed the document set in the document tray in a feeding direction;

a platen;

an image reader;

a drive unit configured to move the image reader within a predetermined range in a sub-scanning direction parallel to the feeding direction;

a memory; and a controller configured to:

control the image reader to read a first document among a plurality of first documents fed by the document feeder over the platen at a reading position;

after the image reader finishes reading the first document among the plurality of first documents, determine whether the sensor has detected another document among the plurality of the first documents is set on the document tray;

control the image reader to read a reference plate arranged over the platen at the reading position in the sub-scanning direction to generate read data, in response to determining that the sensor has not detected that another document among the plurality of the first documents is set on the document tray;

determine whether a value of a pixel in the read data is lower than or equal to a threshold value;

store a value of a position of the pixel in the sub-scanning direction in the memory in response to determining that the value of the pixel is lower than or equal to the threshold value;

set a value of a next reading position of the image reader in the sub-scanning direction to a value different from the stored value of the position of the pixel in the sub-scanning direction in response to receiving a reading instruction to read a second document, by:

selecting a value of a position of the image reader in the sub-scanning direction within the predetermined range at random in response to receiving the reading instruction;

determining whether the selected value is equal to the stored value;

in response to determining that the selected value is not equal to the stored value, setting the value of the position of the image reader in the sub-scanning direction to the selected value; and in response to determining that the selected value is equal to the stored value, selecting the value of the position of the image reader in the sub-scanning direction within the predetermined range at random again;

control the drive unit to move the image reader to the next reading position; and control the image reader to read the second document fed by the document feeder over the platen after the image reader is moved to the next reading position.

* * * * *